(12) United States Patent
Reimer et al.

(10) Patent No.: US 10,175,556 B2
(45) Date of Patent: Jan. 8, 2019

(54) METHOD AND SYSTEM FOR THE GENERATION OF OPTICAL MULTIPARTITE QUANTUM STATES

(71) Applicant: INSTITUT NATIONAL DE LA RECHERCHE SCIENTIFIQUE, Quebec (CA)

(72) Inventors: Christian Reimer, Longueuil (CA); Michael Kues, Montreal (CA); Benjamin Wetzel, Montreal (CA); Piotr Roztocki, Montreal (CA); Yoann Jestin, Montreal (CA); Fabio Grazioso, Montreal (CA); Roberto Morandotti, Montreal (CA)

(73) Assignee: INSTITUTE NATIONAL DE LA RECHERCHE SCIENTIFIQUE, Québec (CA)

( * ) Notice: Subject to any disclaimer, the term of this patent is extended or adjusted under 35 U.S.C. 154(b) by 0 days.

(21) Appl. No.: 15/560,614

(22) PCT Filed: Apr. 12, 2016

(86) PCT No.: PCT/CA2016/050421
§ 371 (c)(1),
(2) Date: Sep. 22, 2017

(87) PCT Pub. No.: WO2016/168920
PCT Pub. Date: Oct. 27, 2016

(65) Prior Publication Data
US 2018/0081255 A1 Mar. 22, 2018

Related U.S. Application Data

(60) Provisional application No. 62/149,880, filed on Apr. 20, 2015.

(51) Int. Cl.
*G02F 1/35* (2006.01)
*G02F 1/39* (2006.01)
(Continued)

(52) U.S. Cl.
CPC ............ *G02F 1/3536* (2013.01); *B82Y 10/00* (2013.01); *G02F 1/35* (2013.01); *G02F 1/365* (2013.01);
(Continued)

(58) Field of Classification Search
CPC ...... G02F 1/3536; G02F 1/39; G02F 2203/15; B82Y 20/00
See application file for complete search history.

(56) References Cited

U.S. PATENT DOCUMENTS

2015/0036967 A1 2/2015 Smith et al.

OTHER PUBLICATIONS

McKinstrie, C.J. et al., "Multicolor multipartite entanglement produced by vector four-wave mixing in a fiber," Optics Express vol. 16, No. 4, pp. 2720-2739 (2008).*
(Continued)

*Primary Examiner* — Daniel Petkovsek
(74) *Attorney, Agent, or Firm* — Gwendoline Bruneau (57) ABSTRACT

A method and a system method for generating optical multipartite quantum states, comprising generating optical fields by at least two different spontaneous four-wave mixing processes and overlapping the optical fields spontaneously generated from the different spontaneous four-wave mixing processes into a same resonator mode of a third-order nonlinear resonator. The system comprises a multicolored laser source exiting a nonlinear third-order resonator at different resonance frequencies belonging to different mode families of the resonator.

16 Claims, 8 Drawing Sheets

(51) Int. Cl.
B82Y 10/00 (2011.01)
G06N 99/00 (2010.01)
G02F 1/365 (2006.01)
B82Y 20/00 (2011.01)

(52) U.S. Cl.
CPC ............... *G02F 1/39* (2013.01); *G06N 99/00* (2013.01); *B82Y 20/00* (2013.01); *G02F 2001/354* (2013.01); *G02F 2203/12* (2013.01); *G02F 2203/15* (2013.01); *Y10S 977/94* (2013.01)

(56) References Cited

OTHER PUBLICATIONS

Bouwmeester D., Pan J. W., Daniell M., Weinfurter H. and Zeilinger A., Observation of Three-Photon Greenberger-Horne-Zeilinger Entanglement, 1999, Phys. Rev. Lett. 82 1345.
Boyd, R. W., Nonlinear Optics. (Academic Press, 2008).
Brendel, J., Gisen, N., Tittel, W., and Zbinden, H., Pulsed energy-time entangled twin-photon source for quantum communication. Phys. Rev. Lett. 82, 2594-2597 (1999).
Chen, J., Lee, K. F., Liang, C. and Kumar, P., Fiber-based telecom-band degenerate-frequency source of entangled photon pairs. Opt. Lett. 31, 2798-2800 (2006).
Chen, K. et al., Experimental Realization of One-Way Quantum Computing with Two-Photon Four-Qubit Cluster States. Phys. Rev. Lett. 99, 120503 (2007).
Clemmen, S. et al., Continuous wave photon pair generation in silicon-on-insulator waveguides and ring resonators. Opt. Express 17, 16558-16570 (2009).
Collins, M. J. et al., Integrated spatial multiplexing of heralded single-photon sources. Nat. Commun. 4, 2582 (2013).
Davanço, M. et al., Telecommunications-band heralded single photons from a silicon nanophotonic chip. Appl. Phys. Lett. 100, 261104 (2012).
Leibfried, D., Barrett, M., Schaetz, T., Britton, J., Chiaverini, J., Itano, W., Jost, J., Langer, C. and Wineland, D., Toward Heisenberg-Limited Spectroscopy with Multiparticle Entangled States, 2004, Science 304 1476-1478.

Lin, Q. and Agrawal, G. P., Vector theory of four-wave mixing: polarization effects in fiber-optic parametric amplifiers. J. Opt. Soc. Am. B 21, 1216 (2004).
Matsuda, N. et al., A monolithically integrated polarization entangled photon pair source on a silicon chip, Sci. Rep. 2, 817 (2012).
Moss, D. J., Morandotti, R., Gaeta, A. L. and Lipson, M., New CMOS-compatible platforms based on silicon nitride and Hydex for nonlinear optics. Nat. Photonics 7, 597-607 (2013).
Pysher, M., Miwa, Y., Shahrokhshahi, R., Bloomer, R. and Pfister, O., Parallel Generation of Quadripartite Cluster Entanglement in the Optical Frequency Comb. Phys. Rev. Lett. 107, 030505 (2011).
Raussendorf, R. and Briegel, H. J., A One-Way Quantum Computer. Phys. Rev. Lett. 86, 5188-5191 (2001).
Raussendorf, R. et al., Measurement-based quantum computation on cluster states, Physical Review A, 68, 022312 (2003).
Raussendorf, R. et al., Topological fault-tolerance in cluster state quantum computation. New J. Phys. 9, 199 (2007).
Reimer, C. et al., Integrated frequency comb source of heralded single photons. Opt. Express 22, 1023-1030 (2014).
Reimer, C. et al., Generation of multiphoton entangled quantum states by means of integrated frequency combs, Science 351, 1176 (2016).
Roslund, J., De Araújo, R. M., Jiang, S., Fabre, C. and Treps, N., Wavelength-multiplexed quantum networks with ultrafast frequency combs. Nat. Photonics 8, 109-112 (2013).
Sharping, J. E. et al., Generation of correlated photons in nanoscale silicon waveguides. Opt. Express 14, 12388-12393 (2006).
Walther, P. et al., De Broglie wavelength of a four-photon state, Nature 429, 158-161 (2004).
Walther, P. et al., Experimental one-way quantum computing. Nature 434, 169-176 (2005).
Wiseman, H.M. et al., Induced coherence with and without induced emission. Phys. Lett. A 270, 245-248 (2000).
Yukawa, M., Ukai, R., Van Loock, P. and Furusawa, A., Experimental generation of four-mode continuous-variable cluster states. Phys. Rev. A 78, 012301 (2008).
Zaidi, H. et al., Entangling the optical frequency comb: Simultaneous generation of multiple 2×2 and 2×3 continuous-variable cluster states in a single optical parametric oscillator. Laser Phys. 18, 659-666 (2008).
Zou, X.Y. et al., Induced coherence and indistinguishability in optical interference. Phys. Rev. Lett. 67, 318-321 (1991).

* cited by examiner

METHOD AND SYSTEM FOR THE GENERATION OF OPTICAL MULTIPARTITE QUANTUM STATES

CROSS-REFERENCE TO RELATED APPLICATIONS

This application is a National Entry Application of PCT application no PCT/CA2016/050421 filed on Apr. 12, 2016 and published in English under PCT Article 21(2) as WO 2016/168920, which itself claims benefit of U.S. provisional application Ser. No. 62/149,880, filed on Apr. 20, 2015. All documents above are incorporated herein in their entirety by reference.

FIELD OF THE INVENTION

The present invention relates to multipartite optical quantum states. More specifically, the present invention is concerned with a method and a system for generation of multipartite quantum states.

BACKGROUND OF THE INVENTION

Complex quantum states, more specifically a special kind of multipartite entangled quantum states referred to as cluster states, form the basis of a measurement-based model for quantum computation [1, 2] and for a related topological approach to quantum error correction [3]. These cluster states are composed of quantum bits, hereinafter referred to as qubits, where at least one qubits is entangled with more than one other qubits. The measurement-based quantum computation model implements algorithms using such cluster states, by means of single-qubit measurements. If the qubits are implemented using quantum optics, i.e. electromagnetic radiation or photons, they are referred to as optical cluster states.

Other multipartite quantum states such as the Greenberger-Horne-Zeilinger (GHZ) state [21] find applications in quantum metrology [22] and sensing, as the sensitivity of interferometers for example can be increased by a factor of the number of involved entangled photons. Entangled states can be assigned a so-called De Broglie wavelength [25], which can be much smaller than the one of a single particle having the same frequency, i.e. wavelength, and scales inversely with the amount of involved particles.

In a quantum optical approach, qubits, or other forms of quantum states, can be implemented as different polarization states, as different optical paths, as different time modes, or as different modes of a nonlinear resonator for example.

Multipartite entanglement makes cluster states different from multiple two-mode, or bipartite, entangled states generated for example by a single nonlinear optical interaction such as spontaneous parametric down-conversion (Sp-PDC) or spontaneous four-wave mixing (Sp-FWM).

Four-mode cluster states have been used to demonstrate quantum computation [1, 2, 4]. In order to increase the efficiency of these computations, both larger clusters as well as the simultaneous use of several clusters are required. This requires generating simultaneously multiplexed clusters with targeted size, which may be very challenging to achieve. With increasing complexity, an additional issue arises from the required scalability of the source with the final goal to achieve compact, low cost and stable devices, which can be multiplexed and packaged.

Until now, various different approaches to generate cluster states as well as other multipartite entangled states have been demonstrated, including coherent locking of multiple optical parametric oscillators, or superimposition of different nonlinear processes such as using pump directionality in a single nonlinear crystal [4], two different nonlinear crystals with a single excitation field [6], a single nonlinear crystal and multiple optical excitation fields [7], or synchronously pumping a single nonlinear crystal within a cavity [8].

Methods for generating multipartite entangled states so far rely on a second-order nonlinear interaction and, moreover, require very complex optical setups. Multiple quantum states have been generated for example by using an optical parametric oscillator below threshold with a wide nonlinear phase-matching bandwidth [6].

In addition to using quantum bits implemented using two-dimensional quantum systems such as photons' polarization [2, 4], quantum computation based on continuous variables such as amplitude and phase has also been implemented [5].

Systems for generating optical multipartite quantum states demonstrated so far rely on second-order nonlinear interactions and require large and complex optical setups. A significant limitation to second-order nonlinear optical crystals is that they require a non-centro symmetric crystal structure and are therefore not directly compatible for integration with silicon-based technology, i.e. are not CMOS-compatible [9]. This restriction drastically limits the possibility for compact integration and miniaturization of the corresponding devices. Another drawback is that these crystals are not directly compatible with fiber-based technology, meaning that all demonstrated cluster state sources are based on complex free-space optics, which may only be transferred out of the labs by overcoming immense difficulties.

As for third-order nonlinear systems, they suffer from a number of other drawbacks such as lower nonlinearity [10], and in cases when more than one excitation field is used, they are impaired by stimulated nonlinear processes, which are parasitic and dominant [10, 11] compared to the desired spontaneous processes needed for quantum state generation. In third-order nonlinear systems, only the generation of correlated and entangled photon pairs have been demonstrated so far, for example in optical fibers [12] as well as on chip in waveguides [13], photonic crystals [14], ring resonators [15] and in coupled resonator waveguides [16]. Recently, the generation of multiplexed correlated photon pairs distributed across a frequency comb has also been achieved on a chip [16]. However, up to now, third-order systems are limited to the generation of two-mode single correlated states.

SUMMARY OF THE INVENTION

More specifically, in accordance with the present invention, there is provided a method for generating optical multipartite quantum states, comprising generating optical fields by at least two different spontaneous four-wave mixing processes and overlapping the optical fields spontaneously generated from the different spontaneous four-wave mixing processes into a same resonator mode of a third-order nonlinear resonator.

There is further provided a system for generating optical multipartite quantum states, comprising a multi-colored laser source; and a nonlinear third-order resonator; wherein the laser source exites the resonator at different resonance frequencies belonging to different mode families of ther resonator.

Other objects, advantages and features of the present invention will become more apparent upon reading of the following non-restrictive description of specific embodiments thereof, given by way of example only with reference to the accompanying drawings.

DESCRIPTION OF EMBODIMENTS OF THE INVENTION

There is generally presented a method and a system for generating and controlling multi-correlated, multi-photon, multi-mode entangled quantum optical states in third-order nonlinear resonant structures.

The third-order nonlinear resonant structures may be birefringent and/or mode-dispersive resonators, characterized by multiple mode families.

The method and the system use at least two different spontaneous four-wave mixing processes (Sp-FWM), for example a degenerate Sp-FWM and a non-degenerate Sp-FWM or two non-degenerate Sp-FWM and three different mode families, in such a way as to radiate the optical fields spontaneously generated from these different processes into a same resonator mode. Radiation of the different nonlinear processes in the same resonator mode introduces quantum correlations of the optical states generated in one resonator mode with those generated in at least two other resonator modes.

In the context of quantum state generation, these generated optical fields can be, but are not limited to, continuous-variable states such as squeezed vacuum, squeezed coherent state, squeezed amplitude-phase, or energy-time correlations for example, or discrete-variable states such as for example time-bin states generated from single-photon states, or photon number states.

As the different nonlinear processes, due to the different involvement of excitation fields, exhibit different phase characteristics, which can be externally controlled, the method enables new possibilities for quantum state control.

In order to suppress undesired stimulated processes emerging from the use of bi-chromatic excitation frequencies, spatial-mode and/or polarization dispersion control is used so that each resonator mode family, i.e. TE00, TM00, TE01, TM01, etc..., exhibits different resonant frequencies but similar free-spectral ranges (FSRs). The resulting offset between the resonances of each mode family can then be tailored in such a way to prevent overlap of possible stimulated FWM processes with any resonator modes. In particular, the offset is adjusted so as to be different from, i.e. smaller or larger than, half the average free-spectral range (FSR) of any possible couple of resonator modes families used, so that the stimulated FWM bandwidths do not overlap with any resonances. This can be achieved using traveling-wave two- or multi-port ring/racetrack resonators as well as in standing wave Fabry-Perot cavities, by selecting the waveguide and mode dispersion.

Figure 1A:
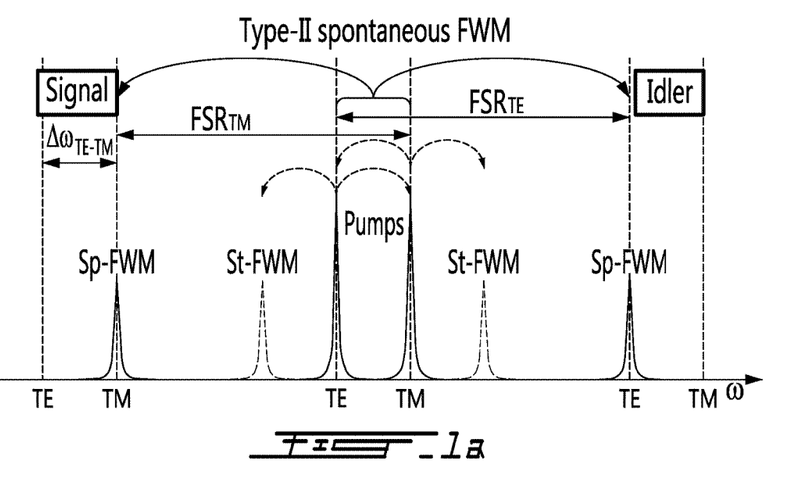
FIG. 1A illustrates suppression of stimulated emission, while allowing spontaneous four-wave mixing (Sp-FWM)
Figure 1B:
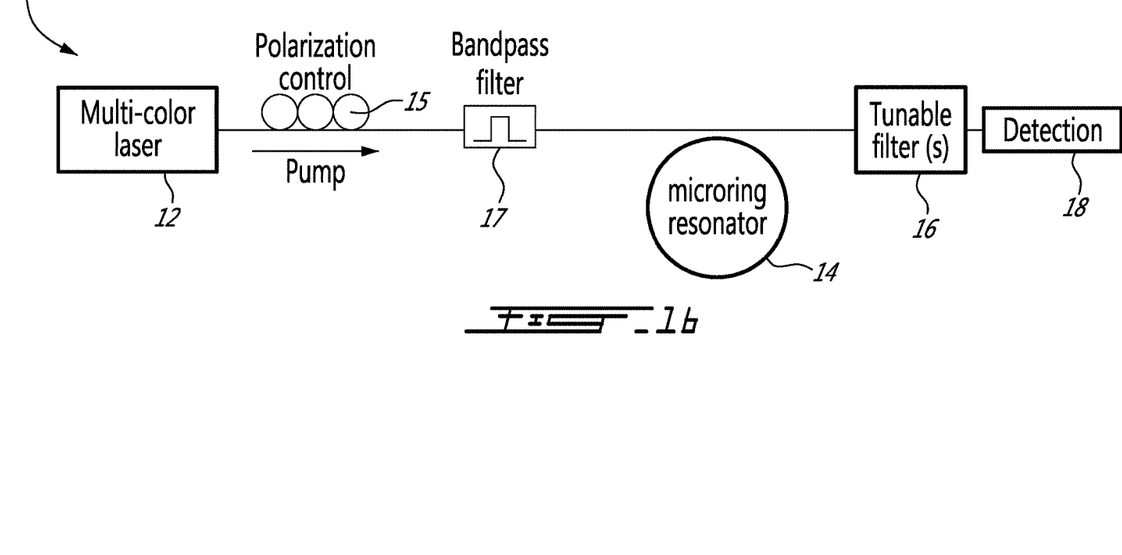
FIG. 1B is a diagrammatic view of a system according to an embodiment of an aspect of the invention.

FIG. 1A illustrates cancellation of stimulated FWM in the case of a microring resonator with single spatial mode operation pumped at two different resonances with two different polarizations, i.e. transverse electric (TE) and transverse magnetic (TM), respectively, using a system as schematically shown in FIG. 1B.

The system 10 shown in FIG. 1B comprises a multi-colored laser source 12 pumping an integrated ring resonator 14 used as the nonlinear cavity, i.e. as an optical parametric oscillator (OPO). A polarization controller 15 is used to adjust the laser beam polarization to the polarization of the modes of the resonator 14. A bandpass filter 17 is used to filter amplified spontaneous emission (ASE) from the laser source 14. At least one tunable filter 16, i.e. a spatial light modulator based system is positioned following the resonator 14 to select the frequencies and to subsequently feed each frequency component or combinations to a separate detector. The detectors 18 used can be single photon detectors, in case of for single-photon-based quantum state generation, to measure the single photon spectrum emitted by the integrated ring resonator 14 as well as the correlation/coincidence generated through the photon pair emission. Alternatively, they can be homodyne detectors including a local oscillator that is generated from the multi-colored laser source in case of squeezed light state generation.

The multi-colored laser source 12 can be for example i) a mode-locked laser that is spectrally reshaped to match the different required resonance frequencies of the micro-cavity 14 mode families, ii) two or more phase-locked laser sources that match the different required resonance frequencies of the micro-cavity 14 mode families, or iii) any other laser system that can provide a coherent-multi colored output. This laser source can be followed, if necessary, by an amplifier to amplify and provide a sufficient power to the source 12 before optically pumping the resonant structure 14.

The resonator 14 is selected to have target resonance characteristics, as described herein, in an add-drop or add-trough configuration.

In this particular example, the resonator 14 had a free-spectral range (FSR) of 200 GHz and an offset $\Delta\omega_{TE-TM}$ between the TE and TM resonances of 70 GHz. Stimulated emission between the two pump fields, i.e. between the TE and the TM pump fields, was suppressed, as the stimulated gain bandwidth did not overlap with any resonance available in the integrated ring resonator 14. Specifically, stimulated FWM (St-FWM, dotted lines in FIG. 1A) was suppressed by the offset between the TE and TM resonances, as the St-FWM gain did not overlap with any of the microring resonances. Correspondingly, spontaneous FWM (Sp-FWM, continuous line in FIG. 1A) was allowed and enhanced by the resonator 14.

The resonator 14 was then pumped at two or more frequency modes, each pump field on a different mode family, for example two different polarizations, or the same polarization but different spatial-modes. In this pump configuration, each pump field generates correlations through degenerated type-0 FWM, i.e. two photons from one pump field generate two new photons on two modes of the same family, as well as non-degenerate type-II FWM, i.e. one photon from each one of the two pump fields, belonging to two different mode families, generate two new photons, each one of these two new photons in one of the two resonator mode families.

Figure 2A:
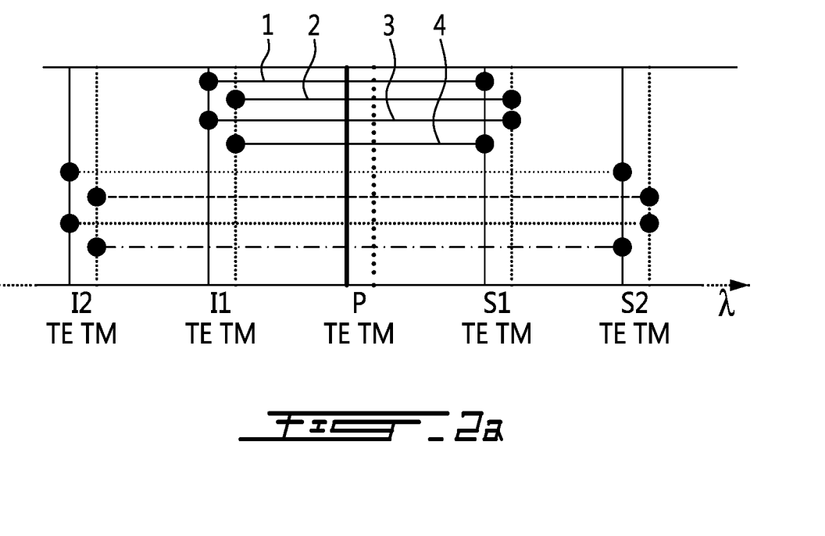
FIG. 2A is diagrammatic view of superimposed nonlinear processes in a bi-chromatically cross-polarized pumped optical parametric oscillator (OPO): Type-0 and Type-II SFWM.
Figure 2B:
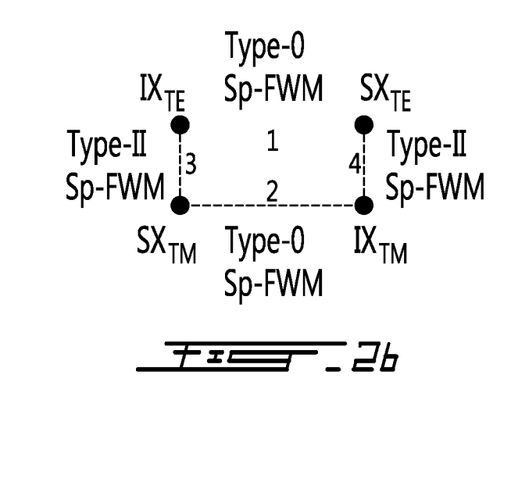
FIG. 2B is diagrammatic view of a four-mode multi-correlated quantum state.
Figure 2C:
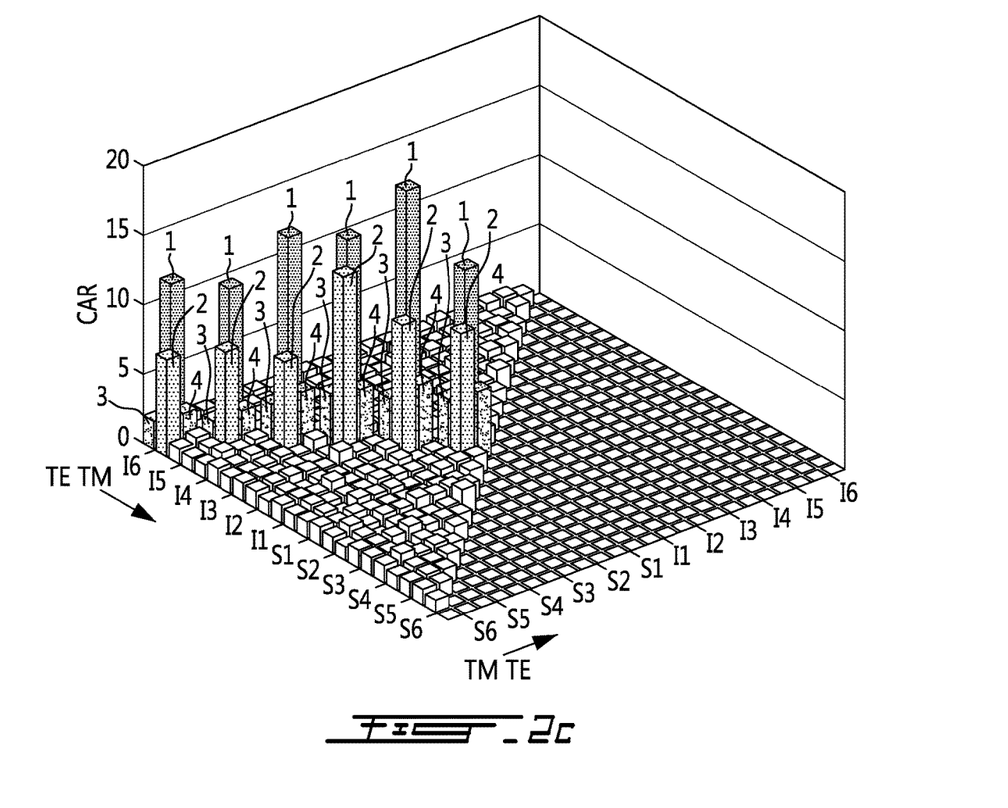
FIG. 2C shows measured correlation matrices of the bi-chromatically pumped OPO of FIG. 2A.
Figure 2D:
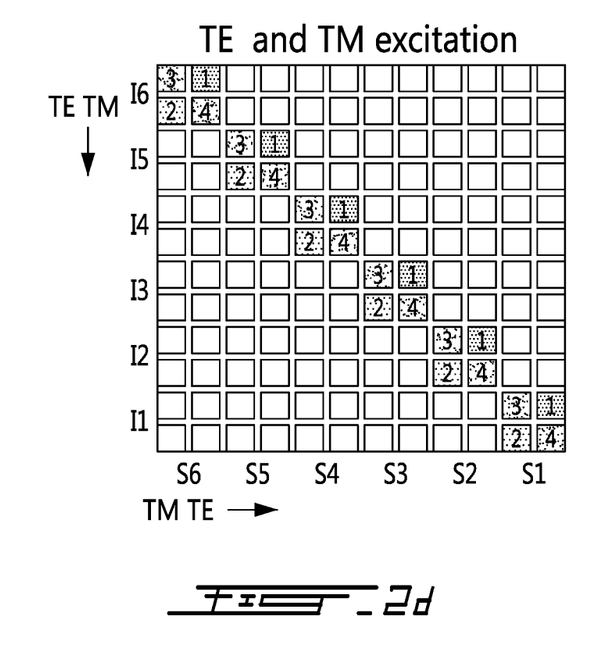
FIG. 2D shows the correlation matrix for the bi-chromatically pumped operation (TE and TM)
Figure 2E:
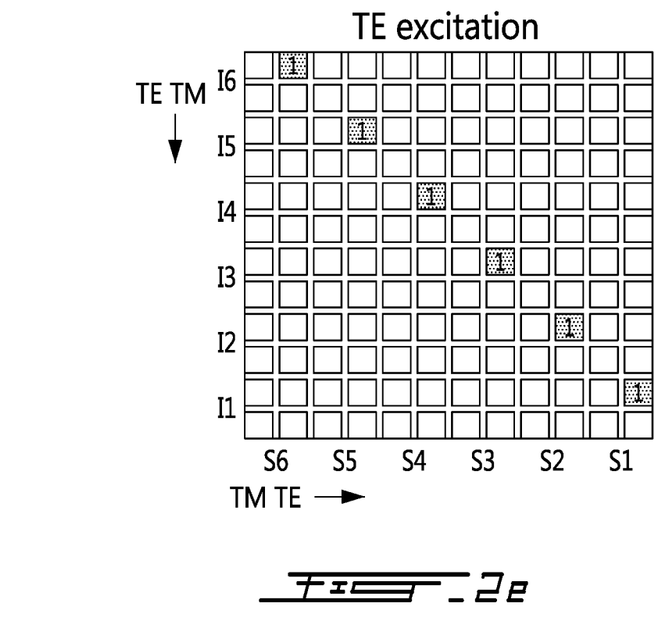
FIG. 2E shows the correlation matrix for the single-frequency pumped operation (TE)
Figure 3A:
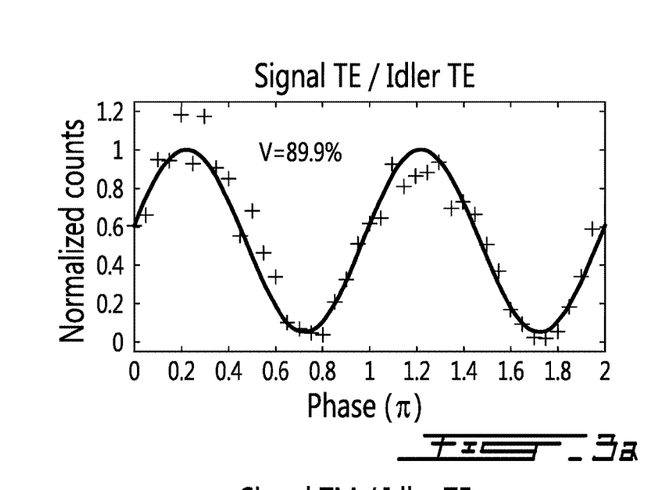
FIG. 3A shows the quantum interference measurement for the combinations SignalTE/IdlerTE.
Figure 3B:
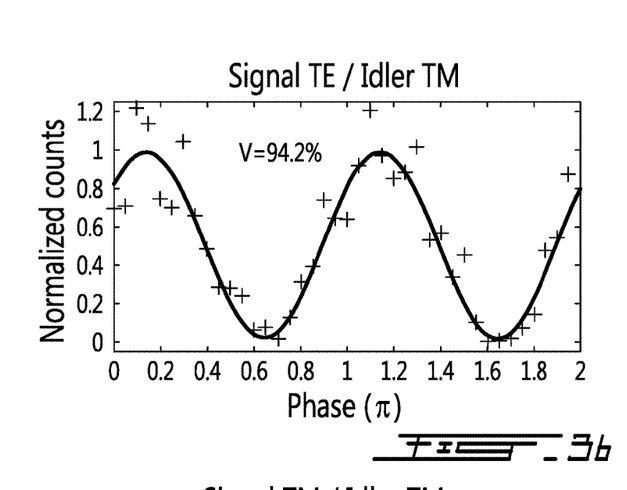
FIG. 3B shows the quantum interference measurement for the combinations SignalTE/IdlerTM.
Figure 3C:
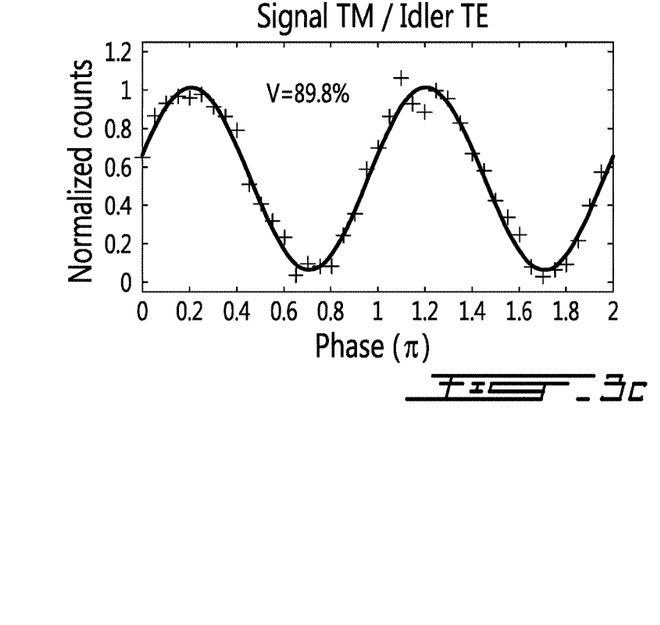
FIG. 3C shows the quantum interference measurement for the combinations SignalTM/IdlerTE.
Figure 3D:
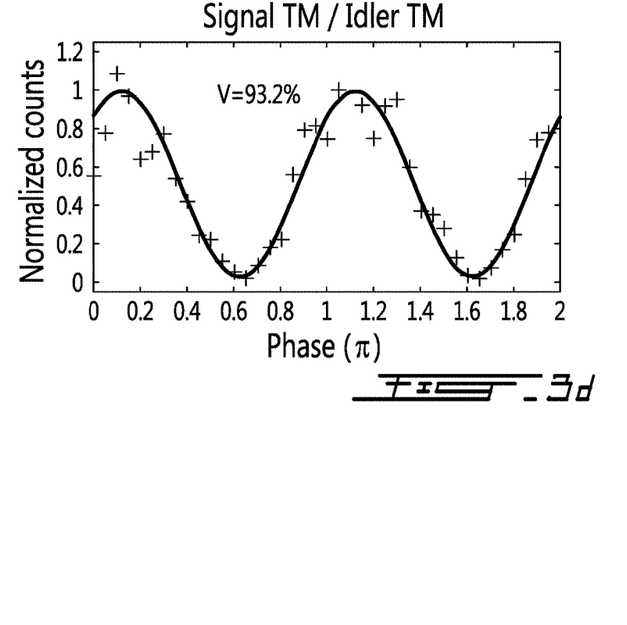
FIG. 3D shows the quantum interference measurement for the combinations SignalTM/IdlerTM.

As a particular example to confirm the nonlinear interaction, as well as the overlap of this interaction in the same modes, a proof-of-principle experiment was performed using the above-described microring resonator 14 pumped at two different resonances with orthogonal polarizations. FIG. 2A summarizes the correlations between two adjacent mode-sets, where the different interactions are numbered 1 and 2 for degenerate type-0 Sp-FWM in respectively TE and TM polarization modes, and 3 and 4 for the non-degenerate type-II Sp-FWM between TE and TM polarization modes. FIG. 2B shows a schematic of the generated correlations between the four modes. The measured correlation matrix is shown in FIGS. 2C and 2D, where six individual and multiplexed sets of four modes each are clearly visible. FIG. 2C shows the coincidence-to-accidental-ratio (CAR), which is 1 for combinations without correlation, the corresponding interactions being numbered 1-4 as in FIG. 2B. FIG. 2D shows the correlation matrix for the bi-chromatically pumped operation (TE and TM), while FIG. 2E shows the correlation matrix for the single-frequency pumped operation (TE). The formation of 6 individual and multiplexed 4-mode multi-correlated states is clearly visible. This measurement clearly confirms the nonlinear interaction and overlap of the different nonlinear processes, i.e. the links between at least two different modes.

Photons generated through FWM can be fully entangled in several degrees of freedom, and depending on the pump and detection configuration, the system can be used to exploit, but is not limited to, time-bin, energy-time as well as amplitude-phase correlations generating both discrete multipartite as well as continuous variable multipartite, i.e. cluster states. Polarization entanglement can also be exploited by combining two coherently pumped sources with a polarization rotation device [18].

One particular form of entanglement, called time-bin entanglement, can be generated by using a double pulsed excitation field. Such excitation generates photon pairs, which are in a superposition of two temporal modes [23]. This form of entanglement was used to further provide a proof of concept that any combination between the signal modes with the idler modes can be individually entangled. FIG. 3 show quantum interference measurement for the combinations SignalTE/IdlerTE (FIG. 3A), SignalTE/IdlerTM (FIG. 3B), SignalTM/IdlerTE (FIG. 3C) and SignalTM/IdlerTM (FIG. 3D), all violating with a visibility V above 71% the Bell-like inequality. It can be clearly seen that entanglement can be generated using both the degenerate as well as non-degenerate Sp-FWM process.

To generate multipartite entangled states, multiple frequency modes can be measured simultaneously, exploiting either individual photons on each frequency mode, or squeezing measured among these frequency resonator modes.

Using for example time-bin entangled qubits, a particular type of multipartite entangled state can be generated. In each mode, the photons can be excited in a superposition of two (or more) temporal modes, called short (S) and long (L). If a single excitation field is used, multi-photon entangled states can be generated as a product state of multiple two-photon entangled states [24]. These states however have a De Broglie wavelength equal to a two-photon state. In particular, with one excitation field, the state $|SSSS>+\exp(i*2y) |SSLL>+\exp(i*2y) |LLSS>+\exp(i*4y) |LLLL>= (|SS>+\exp(i*2y) |LL>)*(|SS>+\exp(i*2y) |LL>)$ can be generated, with y being the phase between the two time-bins of the pump field. However, if the above described dual pump excitation is used, a very different, non-separable quantum state can be generated: $|SSSS>+\exp(i*2y) |SSLL>+\exp(i*2z) |LLSS>+\exp(i*y+i*z) |SLSL>+\exp(i*y+i*z) |LSLS>+\exp(i*2y+i*2z) |LLLL>$, with y and z the phases between the two time bins of the two pump fields. This state is highly controllable due to the tunable two-phase inputs, which can be adjusted separately. While the De Broglie wavelength of this state for y=z=0 is two, it becomes four for y=0, z=pi/2, for example. This approach therefore provides a level of quantum state control which is not possible using a second-order nonlinear process, as only in third-order processes two or more excitation fields are used.

The presented overlap of two different spontaneous four-wave mixing processes (Sp-FWM) can be directly used for the generation of continuous variable optical cluster states, i.e. squeezed coherent states. In contrast to known systems and methods, where two different second order-nonlinear crystals are used to generate continuous variable cluster states over four modes, i. e. two frequency and two polarization modes [6], in the present system and method four different frequency modes are linked. The Sp-FWM process is phase coherent. If the two excitation fields are phase locked, then this applies to the different nonlinear interactions. Exploiting the phenomenon of induced coherence, a fundamental concept which states that also squeezed vacuum can seed coherence [19], the phase of all four modes are directly locked by the two nonlinear processes. The nonlinear process then links the phases of different modes with the phase of the excitation field and leads to the quantum multi-correlated nature needed for cluster states in the squeezed coherent state formalism.

Figure 6:
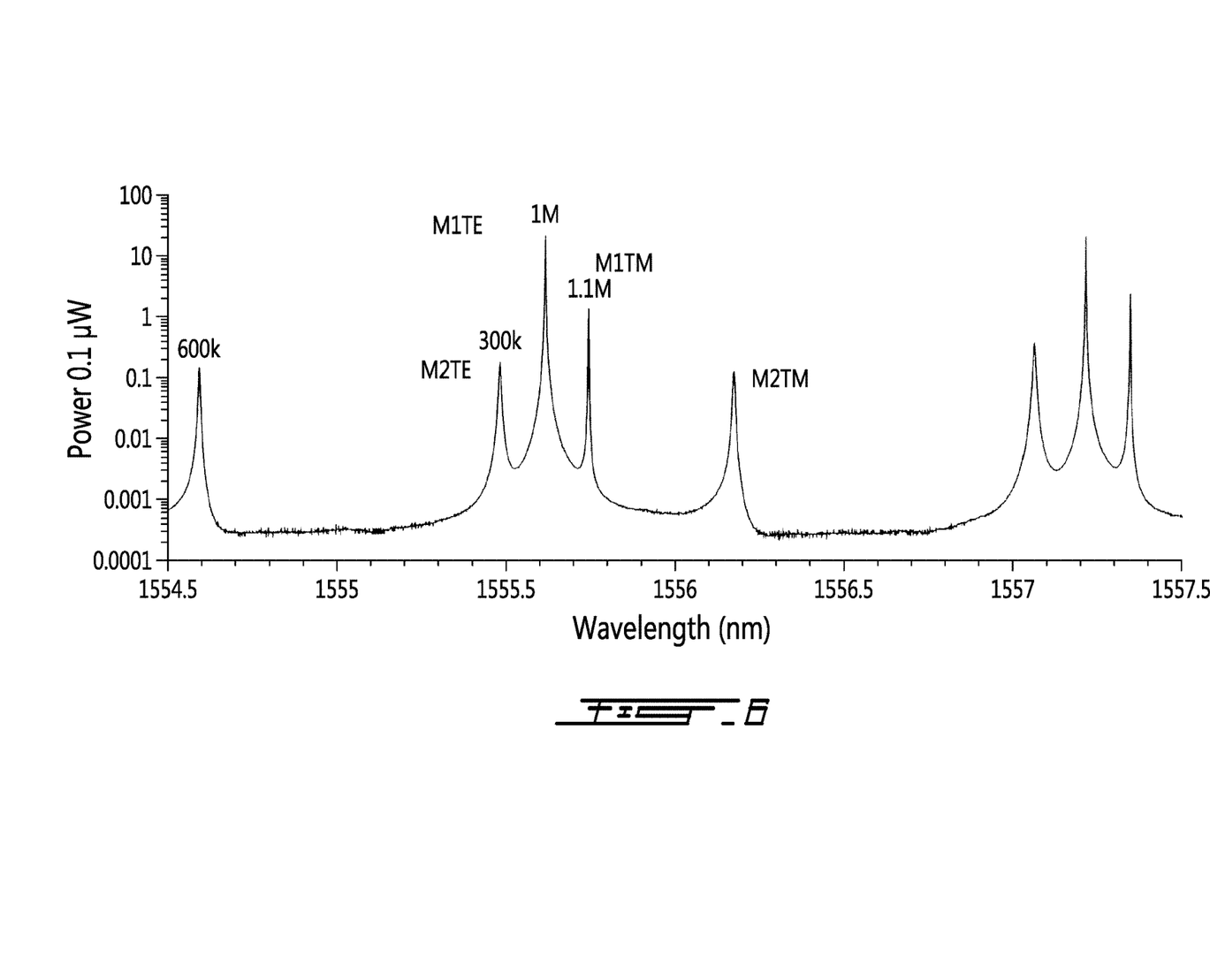
FIG. 6 shows measured resonances of a four-mode, i.e. two spatial, two polarizations, integrated microring resonator.

The present method can be extended from a four-mode multipartite state to six, eight or more modes by using spatial waveguide modes in addition to polarization modes, or spatial modes alone, and increasing the amount of pump fields according to the mode family count. For example, a resonator with two spatial modes, i.e. fundamental and first order modes, such as for example M1 and M2, each of the two modes having two different polarization modes, for example TE and TM, has four different mode families. As an example the measured frequency mode distribution of such an integrated resonator is shown in FIG. 6. FIG. 6 shows measured resonances of a four-mode, i.e. two spatial (M1, M2) and two polarizations (TE, TM), integrated microring resonator; all offset satisfy the criteria to suppress stimulated FWM between any combinations of pump frequencies. In this particular case the resonances have FSRs of around 210 GHz and Q-Factors between 300,000 and 1,100,000.

Figure 5A:
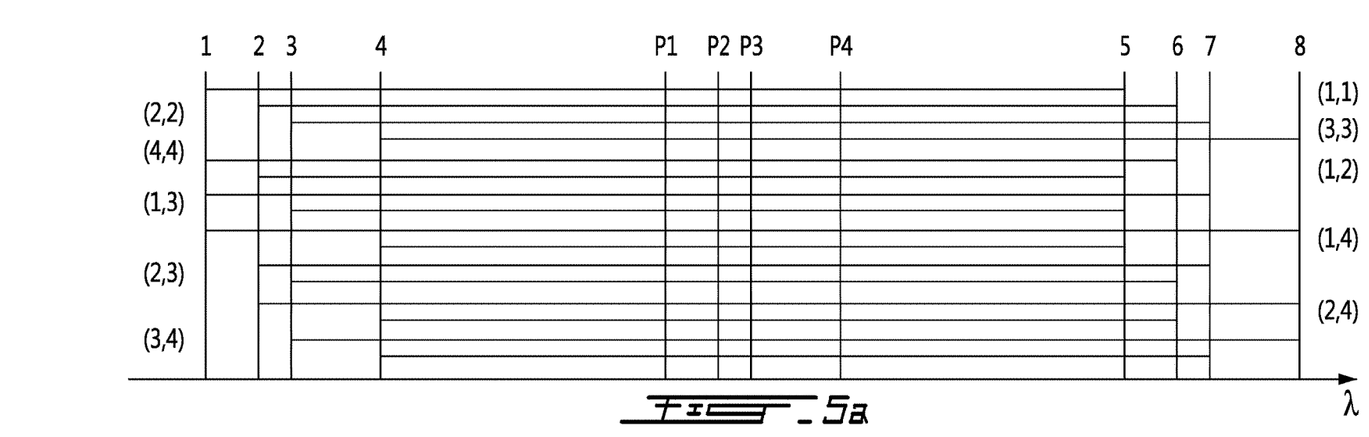
FIG. 5A shows multipartite multi-correlated state generation in a four mode ring resonator.
Figure 5B:
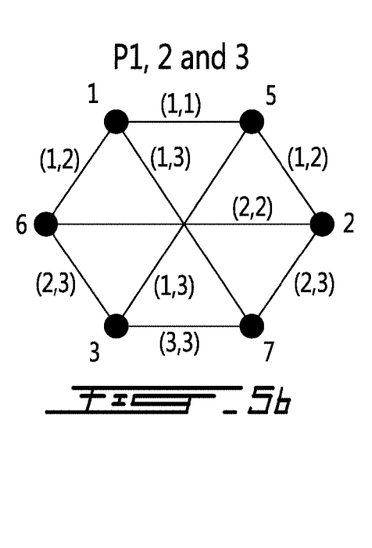
FIG. 5B is a diagrammatic view of 6 mode multicorrelated state, in which each mode is correlated with three other modes.
Figure 5C:
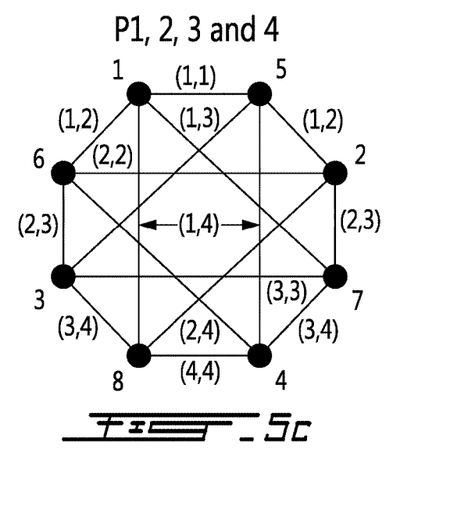
FIG. 5C is a diagrammatic view of a 8 mode multicorrelated state, in which each mode is correlated with 4 other modes.

Such a four-mode resonator can be pumped with up to four pump fields, i.e. one pump field per mode family. The correlated modes for three and four pump fields are shown in FIG. 5. FIG. 5A shows multipartite multi-correlated state generation in a four mode ring resonator. The numbers in parenthesis refer to the pump fields used for the interaction, for example (2,2) refers to degenerate type-0 Sp-FWM from pump field 2, while (1,3) refers to type-II Sp-FWM between pump field 1 and 3. With three pump fields (P1, P2, P3), a 6 mode multicorrelated state is generated, in which each mode is correlated with three other modes (FIG. 5B), while with four pump fields (P1, P2, P3, P4), an 8 mode correlated state is generated, in which each mode is correlated with four modes (FIG. 5C). This principle can be extended to any number of modes.

An important feature of spontaneous four-wave mixing process (Sp-FWM) compared to second-order nonlinear effects such as spontaneous parametric down-conversion (Sp-PDC) is the phase dependency of the process with respect to the pump field(s). This phase dependency can be used to control the generated states by adjusting the absolute and relative phases of the used pump fields. The phase of the generated photons, i.e. signal (s) and idler (i), depends on the phases of the two involved pump fields ($p_1, p_2 \ldots, p_m, p_n$) and is given by "$p_m + p_n = s + I + \text{constant}$" for the non-degenerate and "$2p_n = s + I + \text{constant}$" for the degenerate case. As the modes of several nonlinear processes overlap, stimulated coherence (without emission) occurs [19, 20], locking the phases of all modes together. This in turn allows controlling the quantum state by adjusting the individual pump phases, to for example control the strength of, or remove, certain links between modes of the multipartite states.

Figure 4:
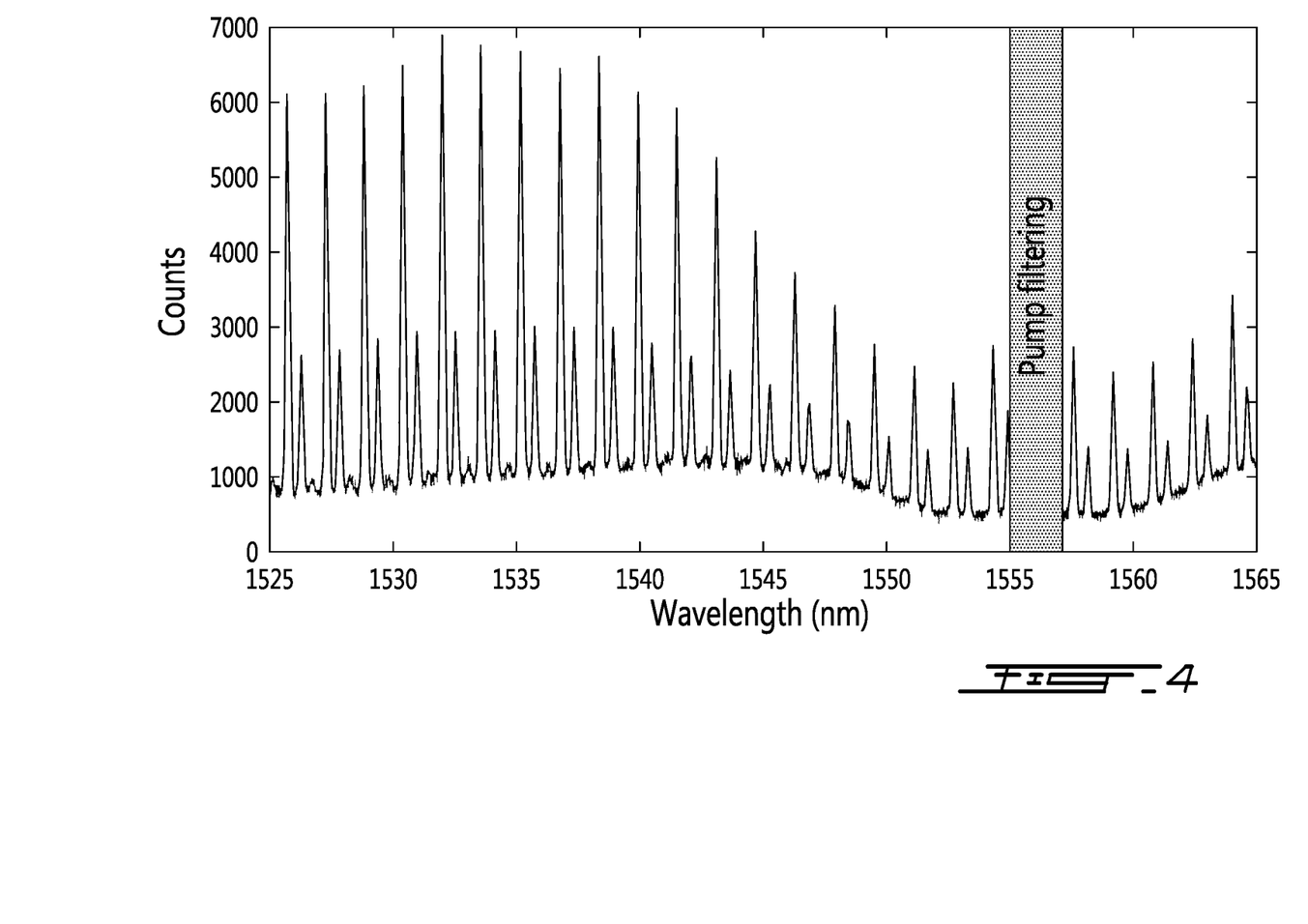
FIG. 4 shows a single photon spectrum of a two mode-family resonator measured by a tunable bandpass filter sweeping method.

As the dispersion of the waveguides can be tailored, it is possible to achieve very low and anomalous dispersion over a very broad wavelength range for a large number of different mode families. This in turn allows extending the phase matching condition required to simultaneously generate several multipartite states. FIG. 6 show the simultaneous generation of six multicorrelated clusters, which is only limited by the detection system used for the measurement. Using a tunable filter together with a single photon detector (see FIG. 1B for example), the single photon spectrum emitted by the integrated device is measured (FIG. 4). Photon emission over a very broad wavelength range on both mode families is clearly seen. It can be clearly seen that photon pairs are generated over a spectral range far exceeding the six measured states. Using dispersion control, the generation of a large number of multipartite states is therefore possible.

As people in the art will now be in position to appreciate, there is thus provided a method and a system exploiting the spatial/polarization multimode structure of an integrated microring resonator, pumped on two different modes, to superimpose two different spontaneous four-wave mixing (Sp-FWM) processes in a single mode. The radiation of different nonlinear processes in the same resonator mode introduces the desired quantum correlations of the optical states generated in one resonator mode with those generated in at least two other resonator modes. As the different nonlinear processes can, due to the different involvement of excitation fields, exhibit different phase characteristics which can be externally controlled, the method enables all-optical quantum state control, i.e. the phases of the pump fields can be used to tune and adjust the generated states. In order to suppress undesired stimulated processes, usually emerging from the use of bi-chromatic excitation frequencies in third-order nonlinear media, spatial-mode and/or polarization dispersion within a nonlinear resonant element is used so that each mode family (e.g. TE00, TM00, TE01, TM01, etc.) exhibits different resonant frequencies but similar free-spectral ranges (FSRs). This leads to an offset among the resonances of each mode family, which can be tailored in such a way that possible stimulated FWM processes do not overlap with any resonator modes and is thus intrinsically suppressed.

As most third-order nonlinear materials are intrinsically compatible with silicon on-chip technology, the scalability and stability issue is fully addressed by the present method and system described hereinabove through a number of examples. Both integrated, fiber, as well as free-space resonators can be built using the described mode structure to enable broad and scalable multiplexed multipartite states. In the demonstrated example, the states were generated inside an integrated microring resonator with 250 μm diameter on a fully CMOS compatible chip. Due to its small size, phase stability is not an issue, and the device can operate without active stabilization. Furthermore, it was shown that it is possible to manufacture a large number of such resonators on a same device, in a fully scalable platform. These devices can then be used individually or even be combined to form larger multipartite state ensembles. The output of the chip devices is then fiber coupled to allow easy read-out and further manipulation.

The present method and system rely on third-order nonlinear interactions, directly compatible with both fiber and integrated chip technologies. The demonstrated system is indeed fabricated in, but not limited to, an ultra-compact fully CMOS compatible chip.

The present method and system for the generation of optical controllable multipartite quantum state generation is based on the superposition of two or more different nonlinear processes while using different mode families of a single nonlinear resonator.

The present method and system are fully scalable and can be extended to any amount of modes, generating large and multiplexed multipartite states.

The present method and system are not limited to the exploitation of only one form of entanglement, but open the door to use both discrete entanglement such as, and not limited to, time-bin or polarization entanglement, and continuous variable entanglement such as, and not limited to, time-energy or amplitude-phase.

The present method and system operate in, and are not limited to, the telecommunication wavelength range, thus are compatible to established fiber networks and novel quantum bit storage devices.

Due to the small dimensions of the present integrated system, the source is intrinsically phase stable and does not require active stabilization.

The present method and system offer the possibility to generate multiple sources on a single device, which for example can be pumped by the same laser, therefore drastically reducing both the required power consumption and overall footprint of the system. Furthermore, several sources on the same device can be further combined to create large multipartite state ensembles.

There is thus provided a method and a system to generate complex entangled states in a third-order nonlinear platform, using a small, compact and scalable device. Using mode-dispersion, the method allows suppressing undesired nonlinear processes, while at the same time enhancing the desired state generation. Furthermore, the phases of the pump fields can be used to tune and adjust the generated states. Finally, the present system may be implemented with CMOS-compatible device fabrication technology, which is a significant characteristic in view its production and commercialization.

The scope of the claims should not be limited by the embodiments set forth in the examples, but should be given the broadest interpretation consistent with the description as a whole.

REFERENCES

1. Raussendorf, R. & Briegel, H. J. A One-Way Quantum Computer. Phys. Rev. Lett. 86, 5188-5191 (2001); R. Raussendorf et al., "Measurement-based quantum computation on cluster states," Physical Review A, 68, 022312 (2003)
2. Walther, P. et al. Experimental one-way quantum computing. Nature 434, 169-176 (2005).
3. Raussendorf, R. et al. Topological fault-tolerance in cluster state quantum computation. New J. Phys. 9, 199 (2007).
4. Chen, K. et al. Experimental Realization of One-Way Quantum Computing with Two-Photon Four-Qubit Cluster States. Phys. Rev. Lett. 99, 120503 (2007).
5. Yukawa, M., Ukai, R., van Loock, P. & Furusawa, A. Experimental generation of four-mode continuous-variable cluster states. Phys. Rev. A 78, 012301 (2008).
6. Pysher, M., Miwa, Y., Shahrokhshahi, R., Bloomer, R. & Pfister, O. Parallel Generation of Quadripartite Cluster Entanglement in the Optical Frequency Comb. Phys. Rev. Lett. 107, 030505 (2011).
7. Zaidi, H. et al. Entangling the optical frequency comb: Simultaneous generation of multiple 2×2 and 2×3 continuous-variable cluster states in a single optical parametric oscillator. Laser Phys. 18, 659-666 (2008).
8. Roslund, J., de Araújo, R. M., Jiang, S., Fabre, C. & Treps, N. Wavelength-multiplexed quantum networks with ultrafast frequency combs. Nat. Photonics 8, 109-112 (2013).
9. Moss, D. J., Morandotti, R., Gaeta, A. L. & Lipson, M. New CMOS-compatible platforms based on silicon nitride and Hydex for nonlinear optics. Nat. Photonics 7, 597-607 (2013).
10. Boyd, R. W. Nonlinear Optics. (Academic Press, 2008).
11. Lin, Q. & Agrawal, G. P. Vector theory of four-wave mixing: polarization effects in fiber-optic parametric amplifiers. J. Opt. Soc. Am. B 21, 1216 (2004).
12. Chen, J., Lee, K. F., Liang, C. & Kumar, P. Fiber-based telecom-band degenerate-frequency source of entangled photon pairs. Opt. Lett. 31, 2798-2800 (2006).
13. Sharping, J. E. et al. Generation of correlated photons in nanoscale silicon waveguides. Opt. Express 14, 12388-12393 (2006).
14. Collins, M. J. et al. Integrated spatial multiplexing of heralded single-photon sources. Nat. Commun. 4, 2582 (2013).
15. Clemmen, S. et al. Continuous wave photon pair generation in silicon-on-insulator waveguides and ring resonators. Opt. Express 17, 16558-16570 (2009).
16. Davanço, M. et al. Telecommunications-band heralded single photons from a silicon nanophotonic chip. Appl. Phys. Lett. 100, 261104 (2012).
17. Reimer, C. et al. Integrated frequency comb source of heralded single photons. Opt. Express 22, 1023-1030 (2014).
18. Matsuda, N. et al. A monolithically integrated polarization entangled photon pair source on a silicon chip, Sci. Rep. 2, 817 (2012).
19. Zou, X. Y. et al. Induced coherence and indistinguishability in optical interference. Phys. Rev. Lett. 67, 318-321 (1991).
20. Wiseman, H. M. et al. Induced coherence with and without induced emission. Phys. Lett. A 270, 245-248 (2000).
21. Bouwmeester D, Pan J W, Daniell M, Weinfurter H and Zeilinger A, 1999, Phys. Rev. Lett. 82 1345.
22. Leibfried D, Barrett M, Schaetz T, Britton J, Chiaverini J, Itano W, Jost J, Langer C and Wineland D, 2004, Science 304 1476-1478.
23. J. Brendel, N. Gisen, W. Tittel, H. Zbinden, Pulsed energy-time entangled twin-photon source for quantum communication. Phys. Rev. Lett. 82, 2594-2597 (1999).
24. Christian Reimer et al., Science 351, 1176 (2016).
25. Walther, P. et al. De Broglie wavelength of a four-photon state, Nature 429, 158-161 (2004).

The invention claimed is:

1. A method for generating optical multipartite quantum states, comprising generating optical fields by at least two different spontaneous four-wave mixing processes and overlapping the optical fields spontaneously generated from the different spontaneous four-wave mixing processes into a same resonator mode of a third-order nonlinear resonator.

2. The method of claim 1, comprising suppressing undesired stimulated processes using at least one of: i) spatial-mode dispersion and ii) polarization dispersion.

3. The method of claim 1, comprising controlling at least one of: i) spatial-mode dispersion and ii) polarization dispersion so that each resonator mode family exhibits different resonant frequencies and a similar free-spectral range.

4. The method of claim 1, comprising controlling at least one of: i) spatial-mode dispersion and ii) polarization dispersion so that each resonator mode family exhibits different resonant frequencies and a similar free-spectral range, and adjusting an offset between resonances of each mode family to prevent overlap between stimulated four-wave mixing emission and modes of the resonator.

5. The method of claim 1, comprising controlling at least one of: i) spatial-mode dispersion and ii) polarization dispersion so that each resonator mode family exhibits different resonant frequencies and a similar free-spectral range, and adjusting an offset between resonances of each mode family to prevent overlap between stimulated four-wave mixing emission and modes of the resonator so that the offset is different from half the average free-spectral range of any possible couple of resonator modes families.

6. The method of claim 1, comprising using one of: traveling-wave two-port ring resonators, traveling-wave multi-port ring resonators, traveling-wave two-port racetrack resonators, traveling-wave multi-port racetrack resonators, and standing wave Fabry-Perot cavities.

7. The method of claim 1, comprising using a spontaneous four-wave mixing process and a non-degenerate spontaneous four-wave mixing process.

8. The method of claim 1, comprising using two non-degenerate spontaneous four-wave mixing processes and three different mode families.

9. The method of claim 1, wherein the generated optical fields are ones of: continuous-variable states and discrete-variable states.

10. The method of claim 1, wherein the generated optical fields are ones of: squeezed vacuum, squeezed coherent state, squeezed amplitude-phase and energy-time correlations.

11. The method of claim 1, wherein the generated optical fields are ones of: time-bin states generated from single-photon states and photon number states.

12. The method of claim 1, comprising selecting a birefringent and/or a mode-dispersive resonator.

13. The method of claim 1, comprising selecting a multi-colored laser source.

14. A system for generating optical multipartite quantum states, comprising:
 a multi-colored laser source; and
 a nonlinear third-order resonator;
 wherein said multi-colored laser source excites said resonator at different resonance frequencies belonging to different mode families of said resonator, optical states generated in one resonator mode being correlated with optical states generated in at least two other resonator modes.

15. The system of claim 14, wherein said multi-colored laser source comprises one of: i) a mode-locked laser and ii) at least two phase-locked laser sources.

16. The system of claim 14, wherein said nonlinear third-order resonator is a birefringent and/or a mode-dispersive resonator.

* * * * *